(12) United States Patent
Kitashou et al.

(10) Patent No.: US 9,399,854 B2
(45) Date of Patent: Jul. 26, 2016

(54) CAB AND WORK VEHICLE

(71) Applicant: KOMATSU LTD., Tokyo (JP)

(72) Inventors: Masato Kitashou, Komatsu (JP); Makoto Yomogita, Hirakata (JP); Naoki Kimura, Komatsu (JP); Masahiko Hamaguchi, Nomi (JP); Junichi Suneya, Komatsu (JP); Takanori Yamahata, Komatsu (JP)

(73) Assignee: KOMATSU LTD., Tokyo (JP)

( * ) Notice: Subject to any disclaimer, the term of this patent is extended or adjusted under 35 U.S.C. 154(b) by 136 days.

(21) Appl. No.: 14/373,578

(22) PCT Filed: Mar. 28, 2014

(86) PCT No.: PCT/JP2014/059229
§ 371 (c)(1),
(2) Date: Jul. 21, 2014

(87) PCT Pub. No.: WO2014/192400
PCT Pub. Date: Dec. 4, 2014

(65) Prior Publication Data
US 2015/0275479 A1 Oct. 1, 2015

(51) Int. Cl.
*E02F 9/16* (2006.01)
*E02F 9/08* (2006.01)
(Continued)

(52) U.S. Cl.
CPC .............. *E02F 9/16* (2013.01); *B62D 33/0617* (2013.01); *E02F 3/7663* (2013.01); *E02F 3/964* (2013.01); *E02F 9/08* (2013.01)

(58) Field of Classification Search
CPC ........ B62D 25/00; B62D 25/04; B62D 33/06; B62D 33/0617; B62D 33/077; E02F 3/76; E02F 3/7663; E02F 9/08; E02F 9/0816; E02F 9/16; E02F 9/163

USPC ................ 296/190.01, 190.03, 190.08, 190.1
See application file for complete search history.

(56) References Cited

U.S. PATENT DOCUMENTS

| 5,413,188 | A | 5/1995 | Ui |
| 6,065,799 | A | 5/2000 | Suwabe et al. |
| 8,152,226 | B2 * | 4/2012 | Iwakata ............. B62D 33/0617 296/190.1 |

FOREIGN PATENT DOCUMENTS

| CN | 1218863 A | 6/1999 |
| CN | 201169792 Y | 12/2008 |

(Continued)

OTHER PUBLICATIONS

The Office Action for the corresponding Chinese application No. 201480000552.0, issued on Aug. 31, 2015.

(Continued)

*Primary Examiner* — Jason S Daniels
(74) *Attorney, Agent, or Firm* — Global IP Counselors, LLP

(57) ABSTRACT

A work vehicle cab includes a floor, a ceiling, a left supporting member, a right supporting member, a front panel, a front panel reinforcement member, a front-left pillar, and a front-right pillar. The ceiling is arranged above the floor. The left supporting member extends upward from the front section of the floor. The right supporting member extends upward from the front section of the floor. The front panel is arranged between the left supporting member and the right supporting member. The front panel reinforcement member, arranged above the front panel, extends in a left-right direction and connects the left supporting member and the right supporting member. The front-left pillar extends from the front section of the ceiling to the front panel reinforcement member. The front-right pillar extends from the front section of the ceiling to the front panel reinforcement member.

17 Claims, 14 Drawing Sheets

(51) Int. Cl.
    *B62D 33/06*     (2006.01)
    *E02F 3/76*     (2006.01)
    *E02F 3/96*     (2006.01)

(56) References Cited

FOREIGN PATENT DOCUMENTS

| CN | 201358487 Y | 12/2009 |
|---|---|---|
| CN | 101687521 A | 3/2010 |
| JP | 5-106240 A | 4/1993 |
| JP | 10-167125 A | 6/1998 |
| JP | 2008-106522 A | 5/2008 |

OTHER PUBLICATIONS

The International Search Report for the corresponding international application No. PCT/JP2014/059229, issued on Jul. 1, 2014.

\* cited by examiner

CAB AND WORK VEHICLE

CROSS-REFERENCE TO RELATED APPLICATIONS

This application is a U.S. National stage application of International Application No. PCT/JP2014/059229, filed on Mar. 28, 2014.

BACKGROUND

1. Field of the Invention

The present disclosure relates to a work vehicle cab, and to a work vehicle.

2. Background Information

A work vehicle is provided with a cab. For instance, the cab is provided with a ceiling, a floor, and a plurality of pillars, as illustrated in Japan Patent Laid-open Patent Publication JP-A-2008-106522. The plurality of pillars is provided extending vertically between the ceiling and the floor, and support the ceiling.

SUMMARY

It is preferable that the pillars have a high flexural strength to support the ceiling. Increasing the thickness of the pillars would improve the strength of the pillars. However, increasing the thickness of the front pillars arranged at the front of the cab may reduce the front visibility for the operator.

The present invention provides a cab and a work vehicle wherein the flexural strength of the front pillars is improved while preventing reduced front visibility.

A work vehicle cab according to one exemplary embodiment of the present invention includes a floor, a ceiling, a left supporting member, a right supporting member, a front panel, a front panel reinforcement member, a front-left pillar, and a front-right pillar. The ceiling is arranged above the floor. The left supporting member extends upward from the front section of the floor. The right supporting member extends upward from the front section of the floor. The front panel is arranged between the left supporting member and the right supporting member. The front panel reinforcement member, arranged above the front panel, extends in a left-right direction and connects the left supporting member and the right supporting member. The front-left pillar extends from the front section of the ceiling to the front panel reinforcement member. The front-right pillar extends from the front section of the ceiling to the front panel reinforcement member.

The front-left and front-right pillars in the work vehicle cab according to the exemplary embodiment are shorter compared to front-left and front-right pillars that are arranged extending from the floor to the ceiling. Therefore, the flexural strength of the front-left and front-right pillars may be improved. Additionally, the left and right supporting members are located downward of the front-left and front-right pillars, thus preventing reduced front visibility even when the left and right supporting members are given a greater thickness.

The front-left pillar may be longer than the left supporting member in the vertical direction. The front-right pillar may be longer than the right supporting member in the vertical direction. Thereby it is possible to further improve front visibility.

The front surface of the left supporting member may be open, and the front surface of the right supporting member may be open. The front panel may be mounted to the left supporting member to close off the opening in the left supporting member. The front panel may be mounted to the right supporting member to close off the opening in the right supporting member.

Thereby it is possible to reduce the size of the left and right supporting members. Additionally, the front panel closes off the openings in the left and right supporting members, preventing a reduction in the strength of the left and right supporting members.

The front-left pillar may be thinner than the left supporting member. The front-right pillar may be thinner than the right supporting member. Thereby it is possible to further improve front visibility. The left and right supporting members are thicker than the front-left and front-right pillars. Accordingly, the flexural strength of the left and right supporting members may be improved.

The left supporting member may be provided with a first left supporting part and a second left supporting part. The first left supporting part may be secured to the left section of the front panel. The second left supporting part may be arranged in the inner lateral side of the first left supporting part and behind the front panel. The second left supporting part may be a separate component from the first left supporting part, and may be secured to the first left supporting part. The right supporting member includes a first right supporting part and a second right supporting part. The first right supporting part may be secured to the right section of the front panel. The second right supporting part may be arranged in the inner lateral side of the first right supporting part and behind the front panel. The second right supporting part may be a separate component from the first right supporting part, and may be secured to the first right supporting part.

In this exemplary embodiment, the left supporting member may be divided into a first left supporting part and a second left supporting part. Therefore, the left supporting member and front panel may be easily assembled even if the left supporting member has a complex shape. The right supporting member may be divided into a first right supporting part and a second right supporting part. Therefore the right supporting member and front panel may be easily assembled, even if the right supporting member has a complicated shape. Hereby, the design freedom for the cross sectional shape of the left supporting member and the right supporting member improves.

The left supporting member may be provided with a first left supporting part and a second left supporting part. The first left supporting part constitutes the outer lateral section of the front panel. The second left supporting part constitutes the inner lateral section of the first left supporting part. The second left supporting part may be a separate component from the first left supporting part, and may be secured to the first left supporting part. The right supporting member includes a first right supporting part and a second right supporting part. The first right supporting part constitutes the outer lateral section of the front panel. The second right supporting part constitutes the inner lateral section of the first right supporting part. The second right supporting part may be a separate component from the first right supporting part, and may be secured to the first right supporting part.

In this exemplary embodiment, the left supporting member may be divided into a first left supporting part and a second left supporting part. Providing first and second left supporting member assemblies facilitates manufacturing of the left supporting member even when the left supporting member has a complicated shape. The right supporting member may be divided into a first right supporting part and a second right supporting part. Providing first and second right supporting members facilitates manufacturing of the right supporting member even when the right supporting member has a complicated shape. Hereby, the design freedom for the cross sectional shape of the left supporting member and the right supporting member improves.

The second left supporting part may be a thicker sheet-thickness than the first left supporting part. The second right supporting part may be a thicker sheet-thickness than the first right supporting part. Accordingly, the flexural rigidity of the left and right supporting members may be improved.

The front-left pillar may include a first left-pillar part and a second left-pillar part. The first left-pillar part constitutes the outer lateral section of the front-left pillar. The second left-pillar part constitutes the inner lateral section of the front-left pillar. The second left-pillar part may be a separate component from the first left-pillar part, and may be secured to the first left-pillar part. The front-right pillar may include a first right-pillar part and a second right-pillar part. The first right-pillar part constitutes the outer lateral section of the front-right pillar. The second right-pillar part constitutes the inner lateral section of the front-right pillar. The second right-pillar part is a separate component from the first right-pillar part and is secured to the first right-pillar part.

In this exemplary embodiment, the front-left pillar may be divided into a first left-pillar part and a second left-pillar part. Providing first and second left-pillar parts facilitates manufacturing of the front-left pillar even when the front-left pillar has a complex shape. The front-right pillar may be divided into a first right-pillar part and a second right-pillar part. Providing first and second right-pillar parts facilitates manufacturing of the front-right pillar even when the front-right pillar has a complex shape. Hereby, the design freedom for the cross sectional shape of the front-left pillar and the front-right pillar improves.

The second left-pillar part may be a thinner sheet-thickness than the second left supporting part. The second right-pillar part may be a thinner sheet-thickness than the second right supporting part. This improves the workability of the second left-pillar part and the second right-pillar part.

The first left-pillar part may be a thinner sheet-thickness than the second left supporting part. The first right-pillar part may be a thinner sheet-thickness than the second right supporting part. This improves the workability of the first left-pillar part and the first right-pillar part.

The front-left pillar may include an inner-left section and an outer-left section. The inner-left section may be connected to the upper surface of the front panel reinforcement member. The outer-left section may extend to below the upper surface of the front panel reinforcement member and connect to the left supporting member. The front-right pillar may include an inner-right section and an outer-right section. The inner-right section may be connected to the upper surface of the front panel reinforcement member. The outer-right section may extend to below the upper surface of the front panel reinforcement member and connect to the right supporting member.

In this exemplary embodiment, it is possible to reduce a size of a seam between the outer-left section of the front-left pillar and the left supporting member. It is also possible to reduce a size of a seam between the outer-right section of the front-right pillar and the right supporting member.

The cab may further include a left connection-reinforcement member and a right connection-reinforcement member. The left connection-reinforcement member may be thinner than the front panel reinforcement member in the vertical direction. The left connection-reinforcement member may be mounted on the upper end of the left supporting member. The right connection-reinforcement member may be thinner than the front panel reinforcement member in the vertical direction. The right connection-reinforcement member may be mounted on the upper end of the right supporting member. The outer-left section may be connected to the left supporting member through the left connection-reinforcement member. Further, the outer-right section may be connected to the right supporting member through the right connection-reinforcement member.

In this exemplary embodiment, a solid connection may be created between the outer-left section of the front-left pillar and the left supporting member while reducing the seam between the outer-left section of the front-left pillar and the left supporting member. A solid connection may also be created between the outer-right section of the front-right pillar and the right supporting member while reducing the seam between the outer-right section of the front-right pillar and the right supporting member.

The cab may further include a pillar supporting member. The pillar supporting member may be arranged above the front panel reinforcement member. The pillar supporting member extends in a left-right direction and connects the front-left pillar and the front-right pillar. Thus, the flexural strength of the front-left pillar and the front-right pillar may be further improved.

The cab may further include a left pillar-reinforcement member and a right pillar-reinforcement member. The left pillar-reinforcement member may be mounted to the inner lateral section of the front-left pillar. The right pillar-reinforcement member may be mounted to the inner lateral section of the front-right pillar. The left section of the pillar supporting member may be connected to the front-left pillar through the left pillar-reinforcement member. Further, the right lateral section of the pillar supporting member may be connected to the front-right pillar through the right pillar-reinforcement member.

In this exemplary embodiment, the strength of the connecting section between the left section of the pillar supporting member and the front-left pillar may be further improved. The strength of the connecting section between the right section of the pillar supporting member and the front-right pillar may also be further improved.

One of the left section of the pillar supporting member and the left pillar-reinforcement member may include a left convex portion. While, the other of the left section of the pillar supporting member and the left pillar-reinforcement member includes a left concave portion that joins with the left convex portion. One of the right section of the pillar supporting member and the right pillar-reinforcement member may include a right convex portion. While the other of the right section of the pillar supporting member and the right pillar-reinforcement member includes a right concave portion that joins with the right convex portion.

In this exemplary embodiment, it is possible to solidly connect the left section of the pillar supporting member to the left pillar-reinforcement member. It is also possible to solidly connect the right section of the pillar supporting member to the right pillar-reinforcement member.

A work vehicle according to another exemplary embodiment of the present invention includes a cab, a front frame, a front wheel, a drawbar, and a blade. The front frame is arranged in front of the cab and extending longitudinally. The front wheel is supported at the front section of the front frame. The drawbar is arranged below the front frame and is pivotally mounted on the front section of the front frame to move vertically. The blade is supported at the rear section of the drawbar.

In this exemplary embodiment, the work vehicle is a motor grader. An operator in the motor grader cab operates the blade in front while watching the blade. Accordingly, the exemplary embodiment is even more effective for preventing reduced front visibility.

The exemplary embodiments of the present invention provide a cab and work vehicle wherein the flexural strength of the front pillars may be improved while preventing reduced front visibility.

DESCRIPTION OF EXEMPLARY EMBODIMENTS

Figure 1:
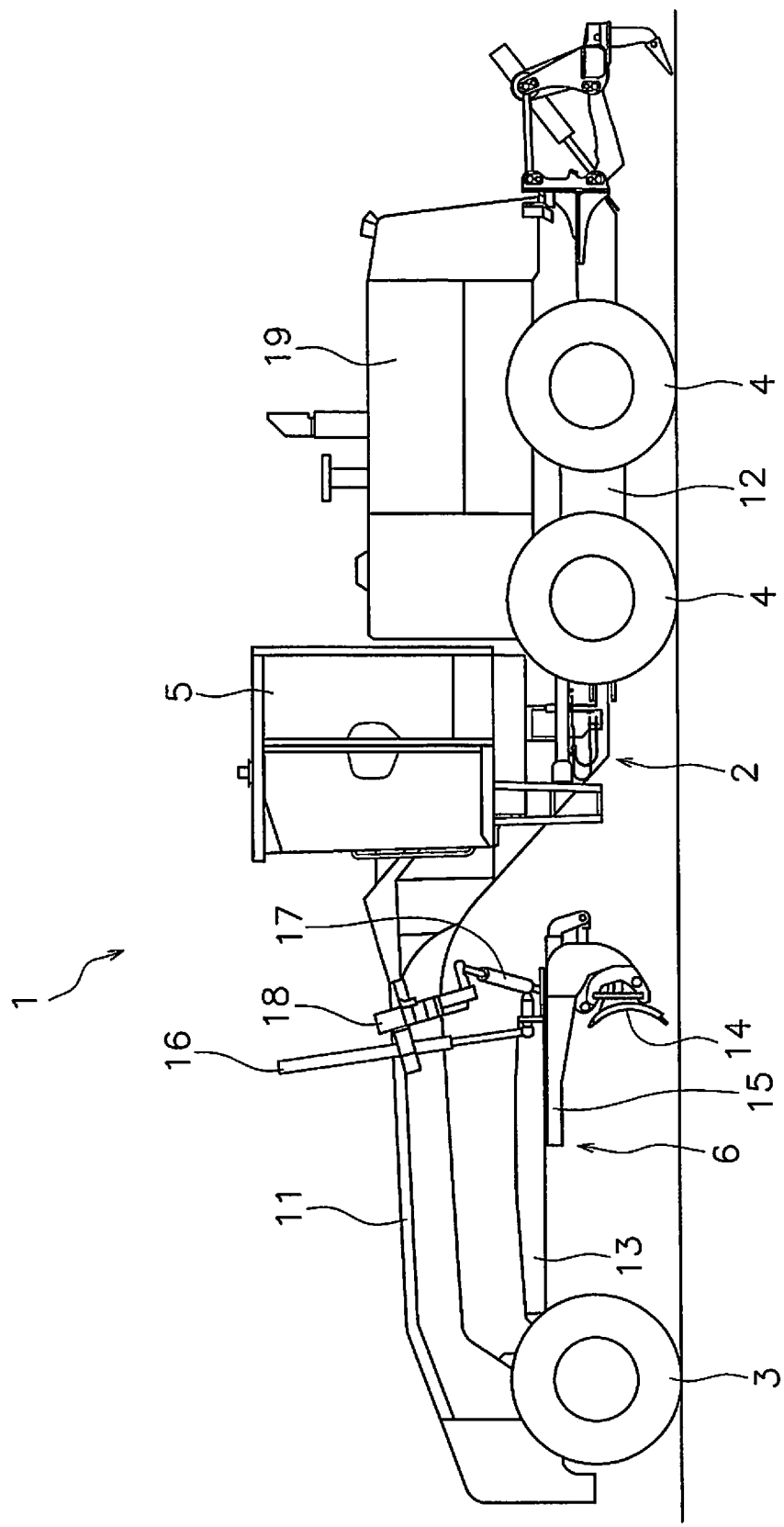
FIG. 1 is a side view of a work vehicle.

Exemplary embodiments of a work vehicle 1 will be detailed below with reference to the drawings. FIG. 1 is a side view of the work vehicle 1. In the description that follows, the terms "up", "down", "left", "right", "front", and "rear" indicate directions from the perspective of an operator in the work vehicle 1. The work vehicle 1 is a motor grader. The work vehicle 1 is provided with a frame 2, front wheels 3, rear wheels 4, a cab 5, and a work implement 6.

The frame 2 includes a front frame 11 and a rear frame 12. The rear end of the front frame 11 is pivotally mounted on the front end of the rear frame 12 to move in a left-right direction. The rear frame 12 supports an engine room 19. The engine room 19 is arranged behind the cab 5. The engine room 19 contains, for example, an engine and a hydraulic pump (not shown) arranged therein.

The front wheels 3 are mounted to the front section of the front frame 11. The rear wheels 4 are mounted to the rear frame 12. The cab 5 is arranged above the front frame 11. The front frame 11 extends frontward from the cab 5. Alternatively, the cab 5 may be arranged above the rear frame 12.

The work implement 6 includes a drawbar 13, a blade 14, a blade rotator 15, a pair of lift cylinders 16, and a shift cylinder 17. The drawbar 13 is arranged underneath the front frame 11. The drawbar 13 is pivotally mounted on the front section of the front frame 11 to move vertically. The blade 14 is supported on the rear section of the drawbar 13 via the blade rotator 15. The blade rotator 15 rotates the blade 14. The blade rotator 15 may include, for example a hydraulic motor and a gear that transmits the rotation of the hydraulic motor to the blade 14.

The pair of lift cylinders 16 is coupled to the front frame 11 via a lifter bracket 18. The pair of lift cylinders 16 is coupled to the drawbar 13. The expansion and compression of the pair of lift cylinders 16 moves the blade 14 vertically. The shift cylinder 17 is coupled to the front frame 11 via the lifter bracket 18. The shift cylinder 17 is coupled to the drawbar 13. The expansion and compression of the shift cylinder 17 moves the drawbar 13 in a left-right direction.

Figure 2:
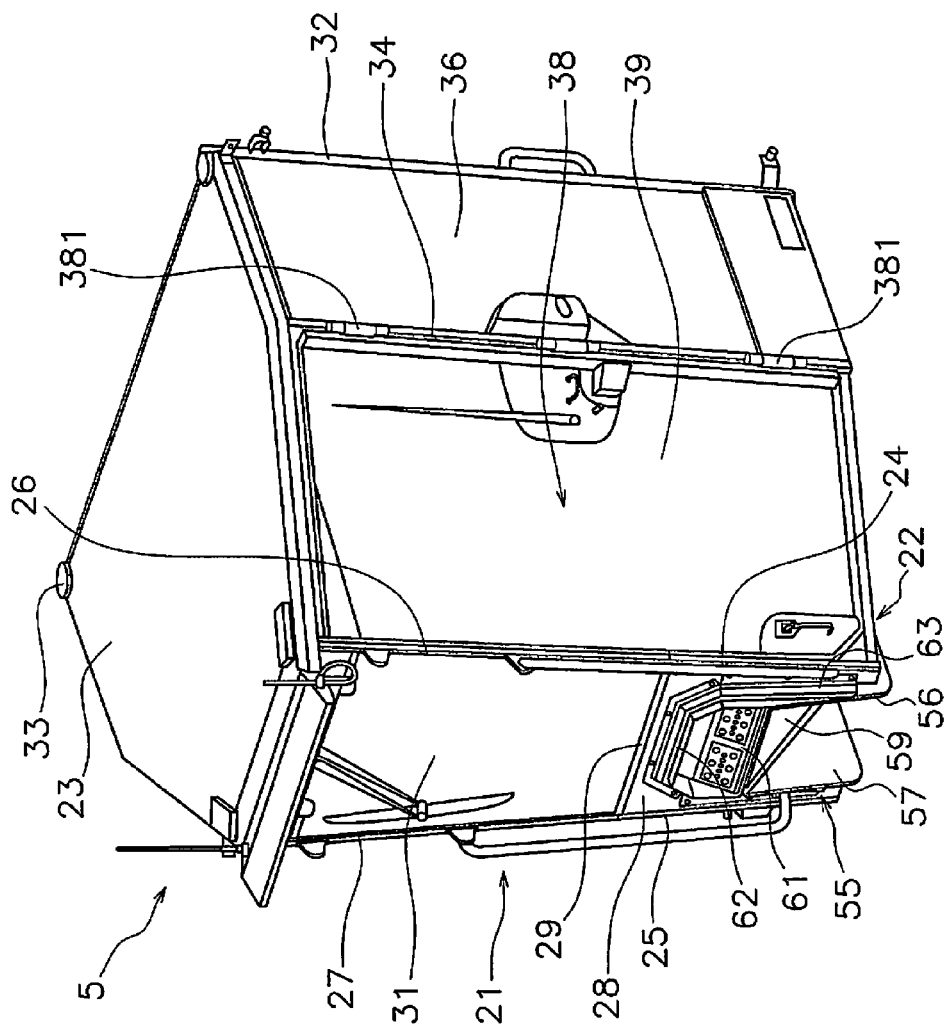
FIG. 2 is a perspective view of a cab.
Figure 3:
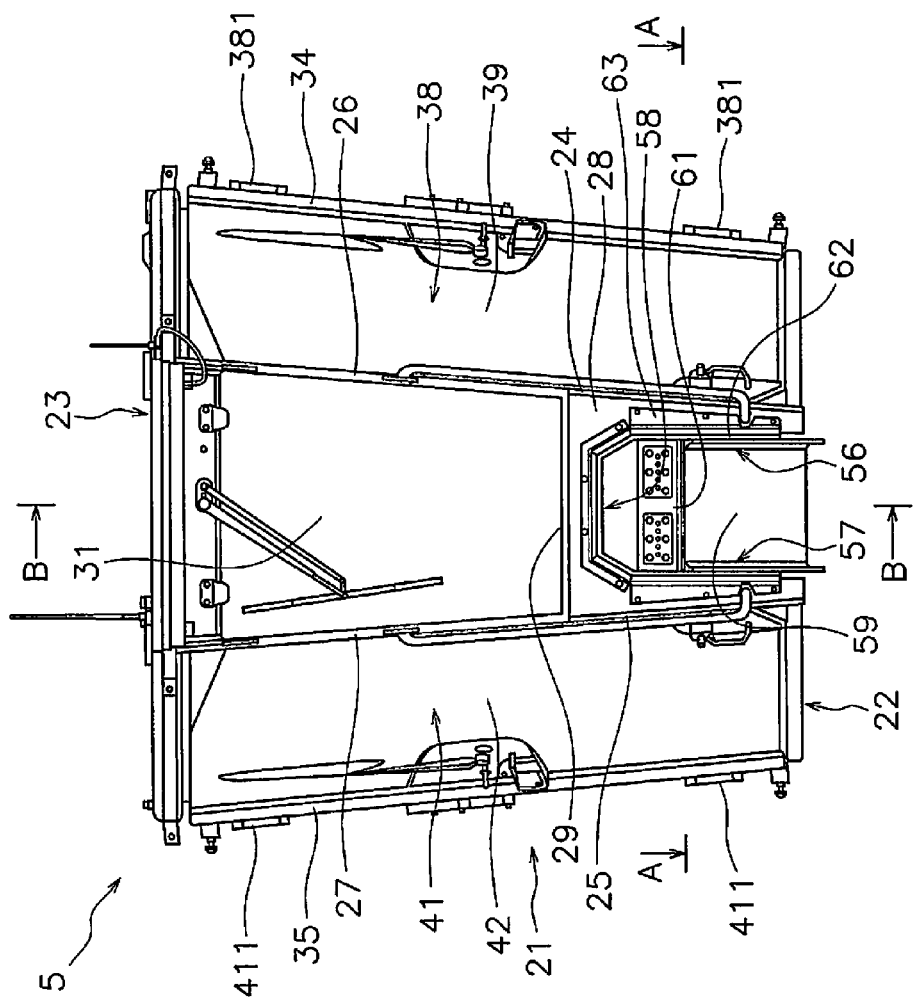
FIG. 3 is a front view of the cab.

FIG. 2 is a perspective view of a cab 5. FIG. 3 is a front view of the cab 5. The cab 5 is a hexagonal prism. The front surface of the cab 5 is tapered. As illustrated in FIG. 2 and FIG. 3, the cab 5 includes a cab body 21 and a floor 22. The floor 22 supports the cab body 21. The cab body 21 includes a ceiling 23, a left supporting member 24, a right supporting member 25, a front-left pillar 26, and a front-right pillar 27.

The ceiling 23 is arranged above the floor 22. The left supporting member 24 and the right supporting member 25 are aligned in a left-right direction. The left supporting member 24 extends upward from the front left corner of the floor 22. The right supporting member 25 extends upward from the front-right corner of the floor 22.

The front-left pillar 26 and the front-right pillar 27 are aligned in a left-right direction. The front-left pillar 26 extends downward from the front left corner of the ceiling 23. The front-left pillar 26 is connected to the upper end of the left supporting member 24. The front-right pillar 27 extends downward from the front-right corner of the ceiling 23. The front-right pillar 27 is connected to the upper end of the right supporting member 25.

A front-center window 31 is arranged between the front-left pillar 26 and the front-right pillar 27. The front-center window 31 is arranged substantially parallel in the left-right direction. The front-center window 31 may be made from a transparent material, such as glass.

As illustrated in FIG. 2, the cab body 21 includes a rear-left pillar 32, and a rear-right pillar 33. The rear-left pillar 32 and the rear-right pillar 33 are aligned in a left-right direction. The rear-left pillar 32 and the rear-right pillar 33 extend vertically. The rear-left pillar 32 is arranged farther behind the front-left pillar 26. The rear-left pillar 32 connects the rear-left corner of the ceiling 23 and the rear-left corner of the floor 22. The rear-right pillar 33 is arranged farther behind the front-right pillar 27. The rear-right pillar 33 connects the rear-right corner of the ceiling 23 and the rear-right corner of the floor 22.

As illustrated in FIG. 3, the cab body 21 includes a left side-pillar 34, and a right side-pillar 35. The left side-pillar 34 and the right side-pillar 35 are aligned in a left-right direction. The left side-pillar 34 and the right side-pillar 35 extend vertically. The left side-pillar 34 is arranged between the front-left pillar 26 and the rear-left pillar 32 in the longitudinal direction. The left side-pillar 34 connects the left section of the ceiling 23 and the left section of the floor 22. The right side-pillar 35 is arranged between the front-right pillar 27 and the rear-right pillar 33 in the longitudinal direction. The right side-pillar 35 connects the right section of the ceiling 23 and the right section of the floor 22.

As illustrated in FIG. 2, a left window 36 is arranged between the left side-pillar 34 and the rear-left pillar 32. The left window 36 may be made from a transparent material, such as glass. The left window 36 is arranged substantially parallel to the longitudinal direction. While not illustrated in the drawings, a right window is arranged between the right side-pillar 35 and the rear-right pillar 33. Similarly to the left window 36, the right window may be made from a transparent material, such as glass, and may be arranged substantially parallel to the longitudinal direction.

A left door 38 is arranged between the front-left pillar 26 and the left side-pillar 34, and the left supporting member 24 and left side-pillar 34. The left door 38 is rotatably mounted on the left side-pillar 34. More specifically, the left door 38 is mounted to the left side-pillar 34 on hinges 381. The left door 38 includes a front-left window 39. The front-left window 39 may be made from a transparent material, such as glass.

As illustrated in FIG. 3, a right door 41 is arranged between the front-right pillar 27 and the right side-pillar 35, and the right supporting member 25 and the right side-pillar 35. The right door 41 is rotatably mounted on the right side-pillar 35. More specifically, the right door 41 is mounted to the right side-pillar 35 on hinges 411. The right door 41 includes a front-right window 42. The front-right window 42 may be made from a transparent material, such as glass.

As illustrated in FIG. 2, in a top view, the front-left window 39 slopes diagonally toward the front-right. The front-right window 42 slopes diagonally towards the front-left. In other words, the front-left window 39 and the front-right window 42 are arranged such that the width between the front-left window 39 and the front-right window 42 narrow towards the front.

Figure 4:
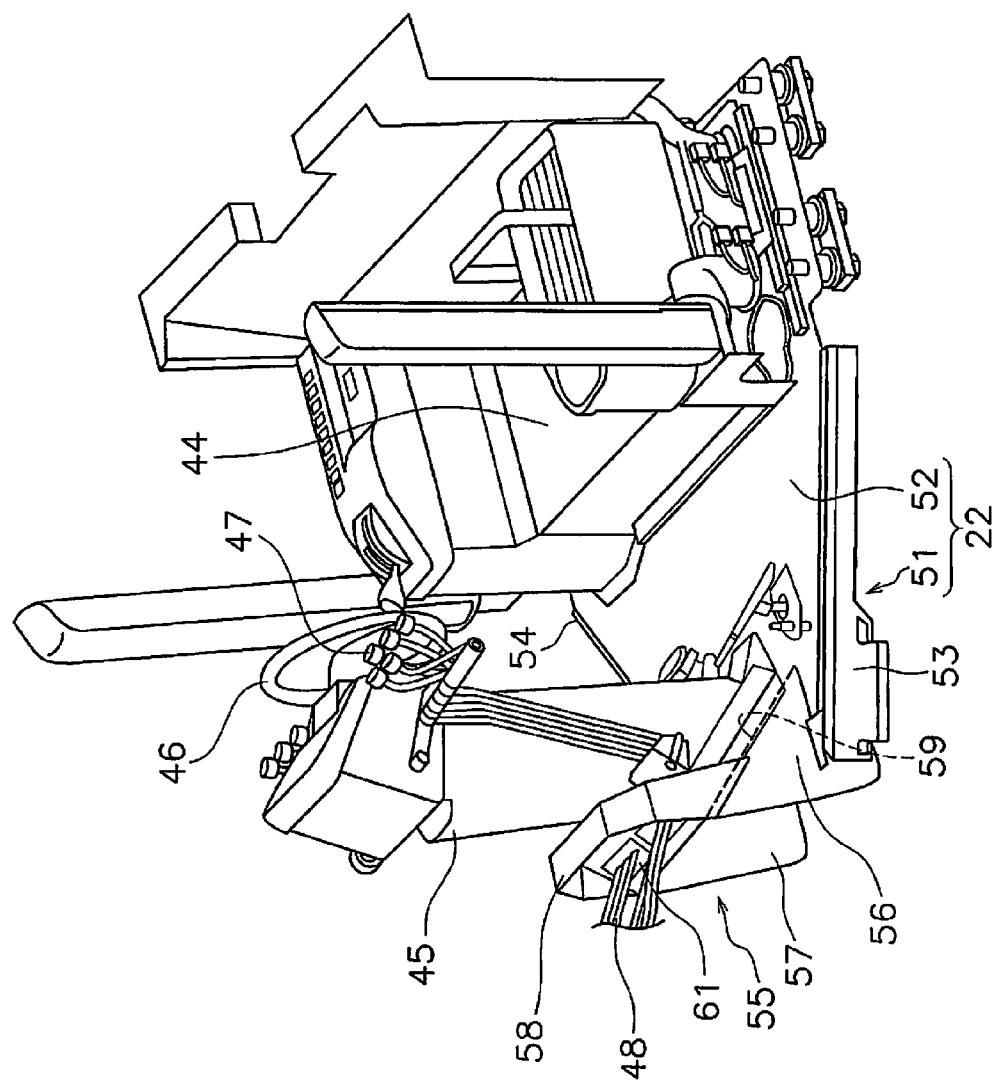
FIG. 4 is a perspective view illustrating the configuration inside the cab.

FIG. 4 is a perspective view illustrating a configuration inside the cab 5. As illustrated in FIG. 4, a driver seat 44, a steering post 45, and a steering wheel 46 are arranged inside the cab 5. The steering post 45 is arranged in front of the driver seat 44. The steering is mounted at the upper part of the steering post 45.

An operating member 47 is also arranged inside the cab 5. The operating member 47 is connected to a pilot hydraulic pipe 48. Only one of the operating members 47 is given the reference numeral 47, with the reference numerals omitted for the other operating members. Further, only one of the multiple pilot hydraulic pipes 48 is given the reference numeral 48 with the reference numerals omitted for the other pilot hydraulic pipes. For example, the operating member 47 is a lever for operating the work implement 6. Pilot hydraulic fluid flows through the pilot hydraulic pipe 48 to operate the work implement 6 in accordance with operation of the operating member 47.

The floor 22 includes a floor frame 51 and a floor plate 52. The floor frame 51 supports the floor plate 52. The floor frame 51 includes a first floor frame 53, and a second floor frame 54, and a convex portion 55. The first floor frame 53 and the second floor frame 54 are aligned in the left-right direction. The first floor frame 53 is located on the left side of the convex portion 55. The second floor frame 54 is located on the right side of the convex portion 55. The first floor frame 53 and the second floor frame 54 are inclined so that the width between the first floor frame 53 and the second floor frame 54 narrows toward the front. The first floor frame 53 is located underneath the left door 38. The second floor frame 54 is located underneath the right door 41.

The floor plate 52 is supported by the first floor frame 53 and the second floor frame 54. The driver seat 44 is arranged above the floor plate 52.

The convex portion 55 is arranged in front of the driver seat 44. The convex portion 55 is connected to the front edge of the first floor frame 53 and the front edge of the second floor frame 54. The convex portion 55 protrudes upward from the floor plate 52. The convex portion 55 includes a first side surface 56, a second side surface 57, an upper surface 58, and an inclined surface 59. The first side surface 56 is one of the left and the right side surfaces. The second side surface 57 is the other of the left and right side surfaces. In the present exemplary embodiment, the first side surface 56 is the left side surface of the convex portion 55. The second side surface 57 is the right side surface of the convex portion 55.

The first side surface 56 and the second side surface 57 are arranged apart from each other in the left-right direction. A portion of the above-described front frame 11 is arranged between the first side surface 56 and the second side surface 57 of the convex portion 55. The upper surface 58 connects the first side surface 56 and the second side surface 57. The inclined surface 59 is arranged behind the first side surface 56 and the second side surface 57. The inclined surface 59 connects the first side surface 56 and the second side surface 57. The inclined surface 59 is arranged lower than the upper surface 58. The inclined surface 59 slopes diagonally frontward and upward.

A hydraulic pipe connector 61 is arranged above the inclined surface 59. The hydraulic pipe connector 61 is arranged between the upper end of the inclined surface 59 and the upper surface 58. The hydraulic pipe connector 61 is arranged between the first side surface 56 and the second side surface 57 of the convex portion 55. The hydraulic pipe connector 61 is connected to the pilot hydraulic pipe 48.

As illustrated in FIG. 2 and FIG. 3, the cab 5 includes a seal 62 and brackets 63. The seal 62 seals the gaps between the cab body 21 and the floor frame 51. The seal 62 is made of an elastic material. For example, the seal 62 may be made of rubber. The brackets 63 mount the seal 62 onto the cab body 21.

Figure 5:
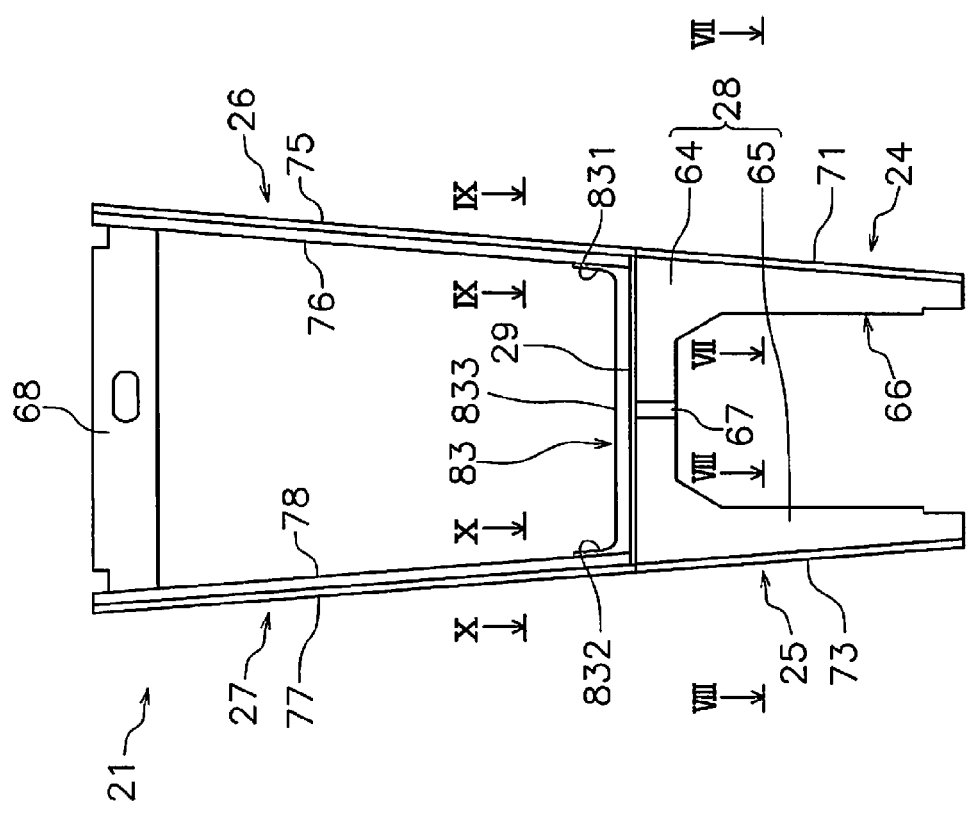
FIG. 5 is a front view illustrating a configuration of the front of the cab body.
Figure 6:
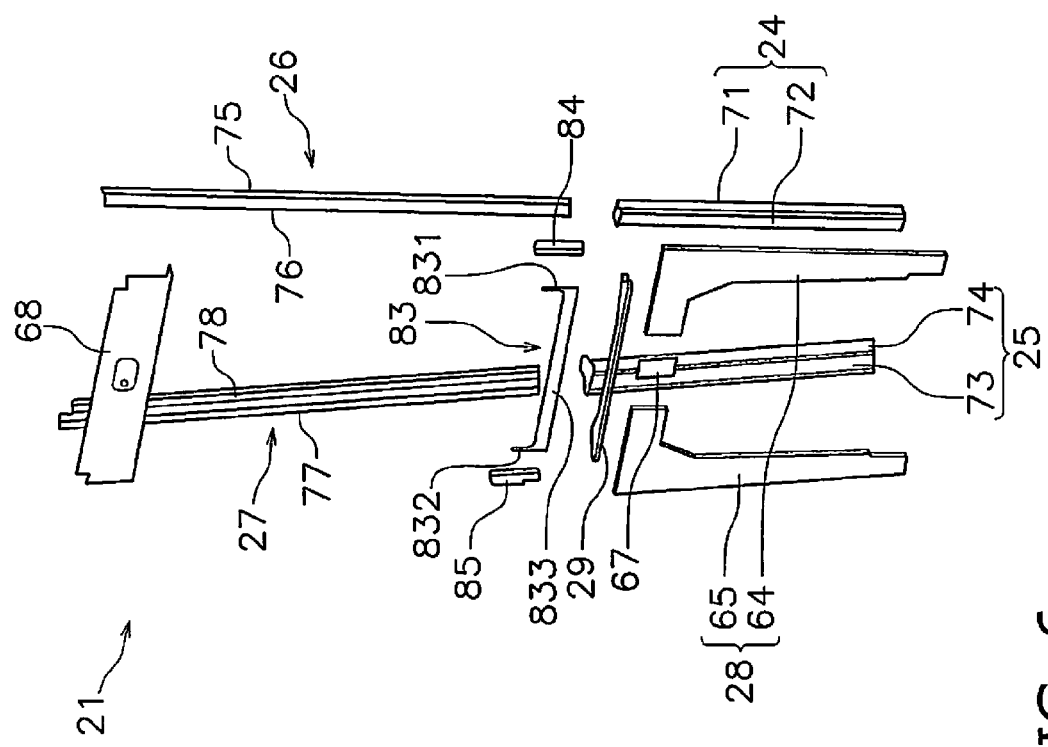
FIG. 6 is an exploded perspective view illustrating a configuration of the front of the cab body.

Next, the configuration of the front of the cab body 21 will be described. FIG. 5 is a front view illustrating a configuration of the front of the cab body 21. FIG. 6 is an exploded perspective view illustrating a configuration of the front of the cab body 21. The above described seal 62 and brackets 63 are omitted from the illustrations in FIG. 5 and FIG. 6.

As illustrated in FIG. 5 and FIG. 6, the cab body 21 includes a front panel 28 and a front panel reinforcement member 29. The front panel 28 is arranged between the left supporting member 24 and the right supporting member 25. The front panel 28 includes a concave portion 66 that is recessed upward. The above-described convex portion 55 on the floor frame 51 is placed inside the concave portion 66. The seal 62 seals the gaps between the concave portion 66 and the convex portion 55.

More specifically, the front panel 28 includes a first panel section 64 and a second panel section 65. The first panel section 64 and the second panel section 65 are separate components. Alternatively, the first panel section 64 and the second panel section 65 may be a single unit. The first panel section 64 and the second panel section 65 are arranged aligned in a left-right direction. The first panel section 64 is connected to the left supporting member 24. The second panel section 65 is connected to the right supporting member 25. A connecting panel section 67 is placed between the upper portion of the first panel section 64 and the upper portion of the second panel section 65. The connecting panel section 67 is connected to the first panel section 64 and the second panel section 65.

The front panel reinforcement member 29 is arranged above the front panel 28. The front panel reinforcement member 29 is a plate-like member extending in a left-right direction. The front panel reinforcement member 29 connects the left supporting member 24 and the right supporting member 25.

The front-left pillar 26 extends from the front left corner of the ceiling 23 to the front panel reinforcement member 29. The front-left pillar 26 is longer than the left supporting member 24 in the vertical direction. The front-right pillar 27 extends from the front-right corner of the ceiling 23 to the front panel reinforcement member 29. The front-right pillar 27 is longer than the right supporting member 25 in the vertical direction.

A front beam member 68 is placed between the upper portion of the front-left pillar 26 and the upper portion of the front-right pillar 27. The front beam member 68 is a in a plate-like member extending in the left-right direction. The front beam member 68 is mounted across the upper portion of the front-left pillar 26 and the upper portion of the front-right pillar 27.

Figure 7:
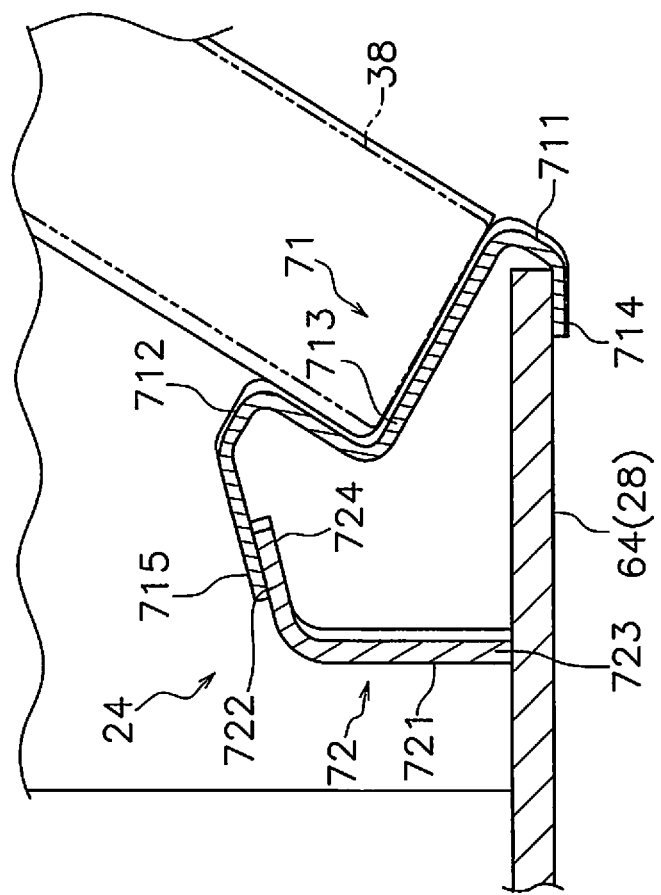
FIG. 7 is a cross-sectional view along VII-VII in FIG. 5.

FIG. 7 is a cross-sectional view along VII-VII in FIG. 5. As illustrated in FIG. 7, the front surface of the left supporting member 24 is open. The front panel 28 is mounted to the left supporting member 24 to close off the opening in the left supporting member 24. More specifically, the left supporting member 24 includes a first left supporting part 71 and a second left supporting part 72. The first left supporting part 71 forms the outer lateral section of the left supporting member 24. The second left supporting part 72 forms the inner lateral section of the left supporting member 24. The second left supporting part 72 is a separate component from the first left supporting part 71. The second left supporting part 72 is a thicker sheet-thickness than the first left supporting part 71. The second left supporting part 72 is secured to the first left supporting part 71.

The first left supporting part 71 is secured to the left section of the front panel 28. The first left supporting part 71 includes a first curved section 711, a second curved section 712, and a concave section 713. The first curved section 711 curves from a position on the left side of the front panel 28 toward a position at the front of the front panel 28. A portion of the first curved section 711 is located on the left side of the front panel 28. An end section 714 of the first curved section 711 is located at the front of the front panel 28. The end section 714 of the first curved section 711 is secured to the front panel 28.

The second curved section 712 is located behind the front panel 28. An end section 715 of the second curved section 712 is secured to the second left supporting part 72. The concave section 713 is located between the first curved section 711 and the second curved section 712. The concave section 713 is located behind the front panel 28. The concave section 713 has a concave shape from the outer lateral side toward the inner lateral side of the left supporting member 24. When the left door 38 is closed, the edge of the left door 38 is in the concave section 713.

The second left supporting part 72 is arranged in the inner lateral side of the first left supporting part 71 and behind the front panel 28. The second left supporting part 72 includes a first flat section 721, and a second flat section 722. The first flat section 721 extends longitudinally. The second flat section 722 extends in a direction intersecting with the longitudinal direction. The second left supporting part 72 curves between the first flat section 721 and the second flat section 722. An end section 723 of the first flat section 721 is secured to the front panel 28. An end section 724 of the second flat section 722 is secured to an end section 715 of the second curved section 712.

The left supporting member 24 is open between the end section 714 of the first curved section 711 and the end section 723 of the first flat section 721. The front panel 28 is open between the end section 714 of the first curved section 711 and the end section 723 of the first flat section 721. That is, the left supporting member 24 is open between the end section of the first left supporting part 71 and the end section of the second left supporting part 72. The front panel 28 closes off the opening between the end section of the first left supporting part 71 and the end section of the second left supporting part 72.

Figure 8:
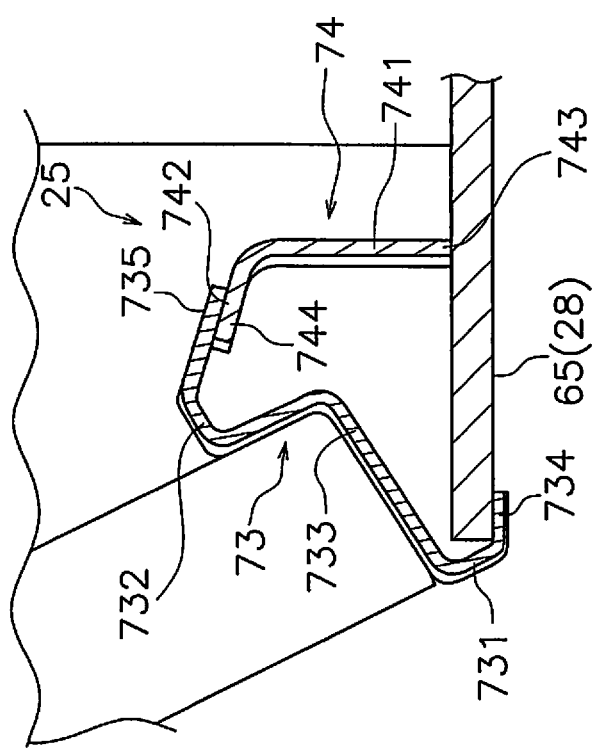
FIG. 8 is a cross-sectional view along VIII-VIII in FIG. 5.

FIG. 8 is a cross-sectional view along VIII-VIII in FIG. 5. As illustrated in FIG. 8, the front surface of the right supporting member 25 is open. The front panel 28 is mounted to the right supporting member 25 to close off the opening in the right supporting member 25. More specifically, the right supporting member 25 includes a first right supporting part 73 and a second right supporting part 74. The first right supporting part 73 forms the outer lateral section of the right supporting member 25. The second right supporting part 74 forms the inner lateral section of the right supporting member 25. The second right supporting part 74 is a separate component from the first right supporting part 73. The second right supporting part 74 is a thicker sheet-thickness than the first right supporting part 73. The second right supporting part 74 is secured to the first right supporting part 73.

The first right supporting part 73 is secured to the right section of the front panel 28. The first right supporting part 73 includes a first curved section 731, a second curved section 732, and a concave section 733. The first right supporting part 73 is bilaterally symmetrical to the first left supporting part 71. Therefore, except for being bilaterally symmetrical therewith, the first curved section 731, the second curved section 732, and the concave section 733 of the first right supporting part 73 are respectively the same as the first curved section 711, the second curved section 712, and the concave section 713 of the first left supporting part 71.

The second right supporting part 74 is arranged in the inner lateral side of the first right supporting part 73 and behind the front panel 28. The second right supporting part 74 includes a first flat section 741 and a second flat section 742. The second right supporting part 74 is bilaterally symmetrical to second left supporting part 72. Therefore, except for being bilaterally symmetrical therewith, the first flat section 741 and the second flat section 742 of the second right supporting part 74 are respectively the same as the first flat section 721, and the second flat section 722 of the second left supporting part 72.

An end section 734 of the first curved section 731 is secured to the front panel 28. An end section 735 of the second curved section 732 is secured to an end section 744 of the second flat section 742. An end section 743 of the first flat section 741 is secured to the front panel 28.

The right supporting member 25 is open between the end section 734 of the first curved section 731 and the end section 743 of the first flat section 741. The front panel 28 closes off the opening between the end section 734 of the first curved section 731 and the end section 743 of the first flat section 741. That is, right supporting member 25 is open between the end section of the first right supporting part 73 and the end section of the second right supporting part 74. The front panel 28 closes off the opening between the end section of the first right supporting part 73 and the end section of the second right supporting part 74.

Figure 9:
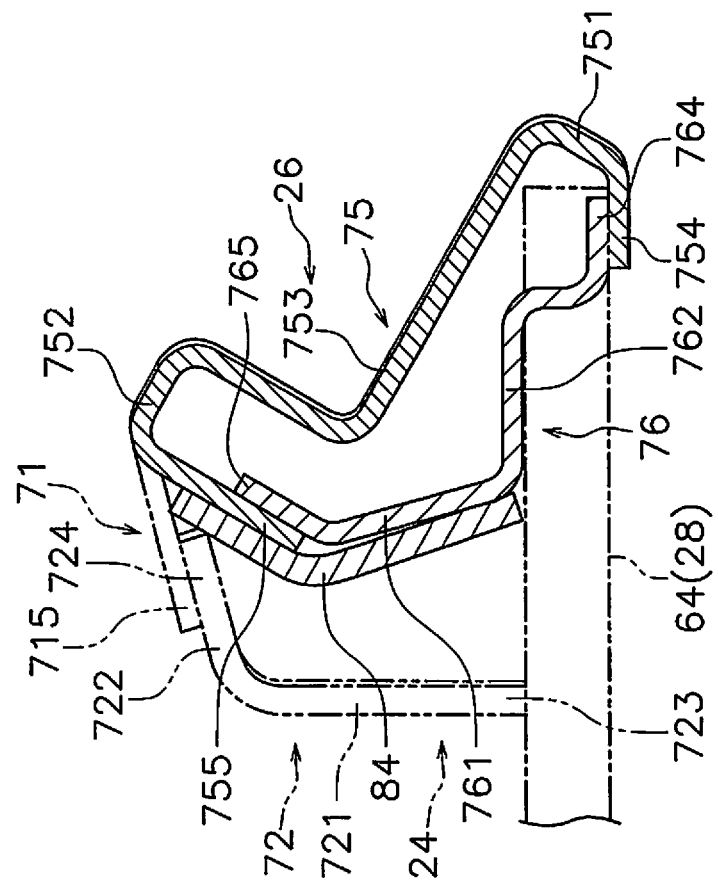
FIG. 9 is a cross-sectional view along IX-IX in FIG. 5.

FIG. 9 is a cross-sectional view along IX-IX in FIG. 5. As illustrated in FIG. 9, the front-left pillar 26 includes a first left-pillar part 75 and a second left-pillar part 76. The first left-pillar part 75 forms the outer-left section of the front-left pillar 26. The second left-pillar part 76 forms the inner-left section of the front-left pillar 26. The second left-pillar part 76 is a separate component from the first left-pillar part 75. The first left-pillar part 75 has substantially the same sheet-thickness as the second left-pillar part 76. The first left-pillar part 75 is a thinner sheet-thickness than the second left supporting part 72. The second left-pillar part 76 is a thinner sheet-thickness than the second left supporting part 72. The second left-pillar part 76 is secured to the first left-pillar part 75.

The first left-pillar part 75 includes a first curved section 751, a second curved section 752, and a concave section 753. The first curved section 751 of the first left-pillar part 75 has the same shape as the first curved section 711 of the first left supporting part 71. The first curved section 751 of the first left-pillar part 75 is located above the first curved section 711 of the first left supporting part 71. In a plan view, the first curved section 751 of the first left-pillar part 75 overlaps with the first curved section 711 of the first left supporting part 71. The first curved section 751 of the first left-pillar part 75 is flush with the first curved section 711 of the first left supporting part 71. An end section 754 of the first curved section 751 is secured to the second left-pillar part 76.

The concave section 753 in the first left-pillar part 75 has the same shape as the concave section 713 in the first left supporting part 71. The concave section 753 in the first left-pillar part 75 is located above the concave section 713 in the first left supporting part 71. In a plan view, the concave section 753 of the first left-pillar part 75 overlaps with the concave section 713 of the first left supporting part 71. The concave section 753 in the first left-pillar part 75 is flush with the concave section 713 in the first left supporting part 71.

The second curved section 752 is located behind the front panel 28. A portion of the second curved section 752 is located above a portion of the second curved section 712 of the first left supporting part 71. An end section 755 of the second curved section 752 is arranged in the outer lateral side of the end section 715 of the second curved section 712. The end section 755 of the second curved section 752 is secured to the second left-pillar part 76.

The second left-pillar part 76 is arranged in the outer lateral side of the second left supporting part 72. Therefore, the front-left pillar 26 is thinner than the left supporting member 24. The second left-pillar part 76 includes a first end section 764, and a second end section 765. The first end section 764 is located above the front panel 28. The first end section 764 is secured to the end section 754 of the first curved section 751. In a plan view, the second end section 765 is located behind the front panel 28. The second end section 765 is secured to the end section 755 of second curved section 752.

The second left-pillar part 76 includes a first flat section 761, and a second flat section 762. The first flat section 761 is arranged in the outer lateral side of the first flat section 721 of the second left supporting part 72. The first flat section 761 slopes diagonally frontward and laterally outward. The first flat section 761 is located between the second flat section 762 and second end section 765. The second left-pillar part 76 curves between the first flat section 761 and the second end section 765. The second flat section 762 extends in a left-right direction. The second left-pillar part 76 curves between the first flat section 761 and the second flat section 762. The second flat section 762 is located between the first flat section 761 and the first end section 764. The second left-pillar part 76 curves between the second flat section 762 and the first end section 764.

Figure 10:
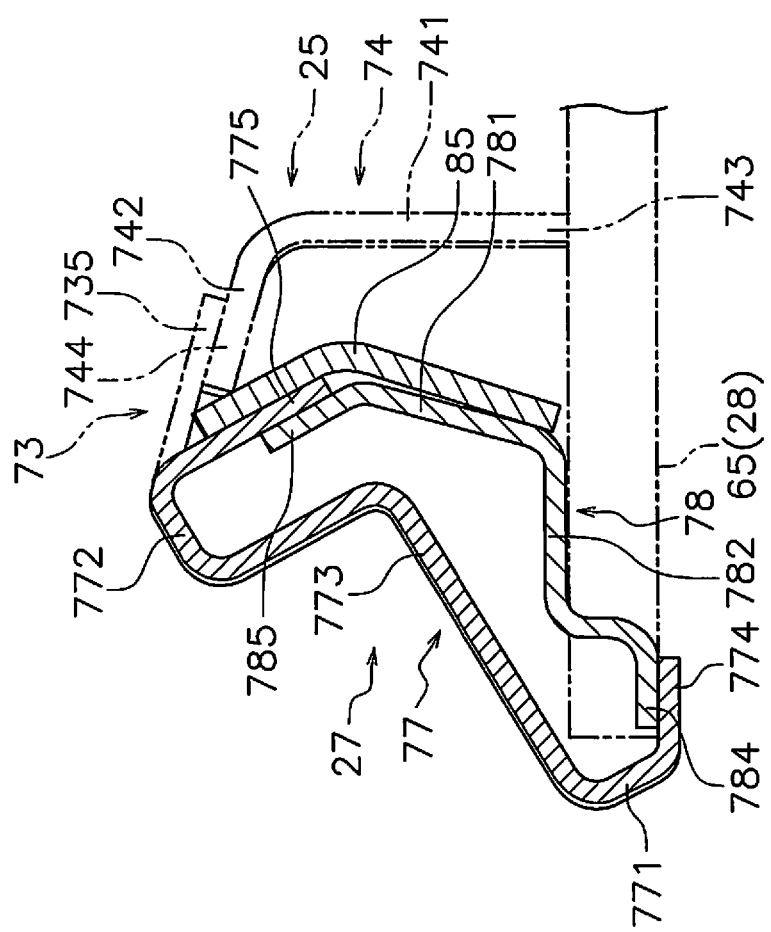
FIG. 10 is a cross-sectional view along X-X in FIG. 5.

FIG. 10 is a cross-sectional view along X-X in FIG. 5. As illustrated in FIG. 10, the front-right pillar 27 is thinner than the right supporting member 25. The front-right pillar 27 includes a first right-pillar part 77 and a second right-pillar part 78. The first right-pillar part 77 forms the outer-right section of the front-right pillar 27. The second right-pillar part 78 forms the inner-right section of the front-right pillar 27. The second right-pillar part 78 is a separate component from the first right-pillar part 77 and is secured to the first right-pillar part 77. The second right-pillar part 78 is a thinner sheet-thickness than the second right supporting part 74. The first right-pillar part 77 is a thinner sheet-thickness than the second right supporting part 74.

The first right-pillar part 77 includes a first curved section 771, a second curved section 772, and a concave section 773. The first right-pillar part 77 is bilaterally symmetrical to the first left-pillar part 75. Therefore, except for being bilaterally symmetrical therewith, the first curved section 771, the second curved section 772, and the concave section 773 of the first right-pillar part 77 are respectively the same as the first curved section 751, the second curved section 752, and the concave section 753 of the first left-pillar part 75.

The second right-pillar part 78 includes a first end section 784, a second end section 785, a first flat section 781, and a second flat section 782. An end section 774 of the first curved section 771 is connected to first end section 784. An end section 775 of the second curved section 772 is connected to the second end section 785. The second right-pillar part 78 is bilaterally symmetrical to the second left-pillar part 76. Therefore, except for being bilaterally symmetrical therewith, the first end section 784, the second end section 785, the first flat section 781, and the second flat section 782 of the second right-pillar part 78 are respectively the same as the first end section 764, the second end section 765, the first flat section 761, and the second flat section 762 of the second left-pillar part 76.

Figure 11:
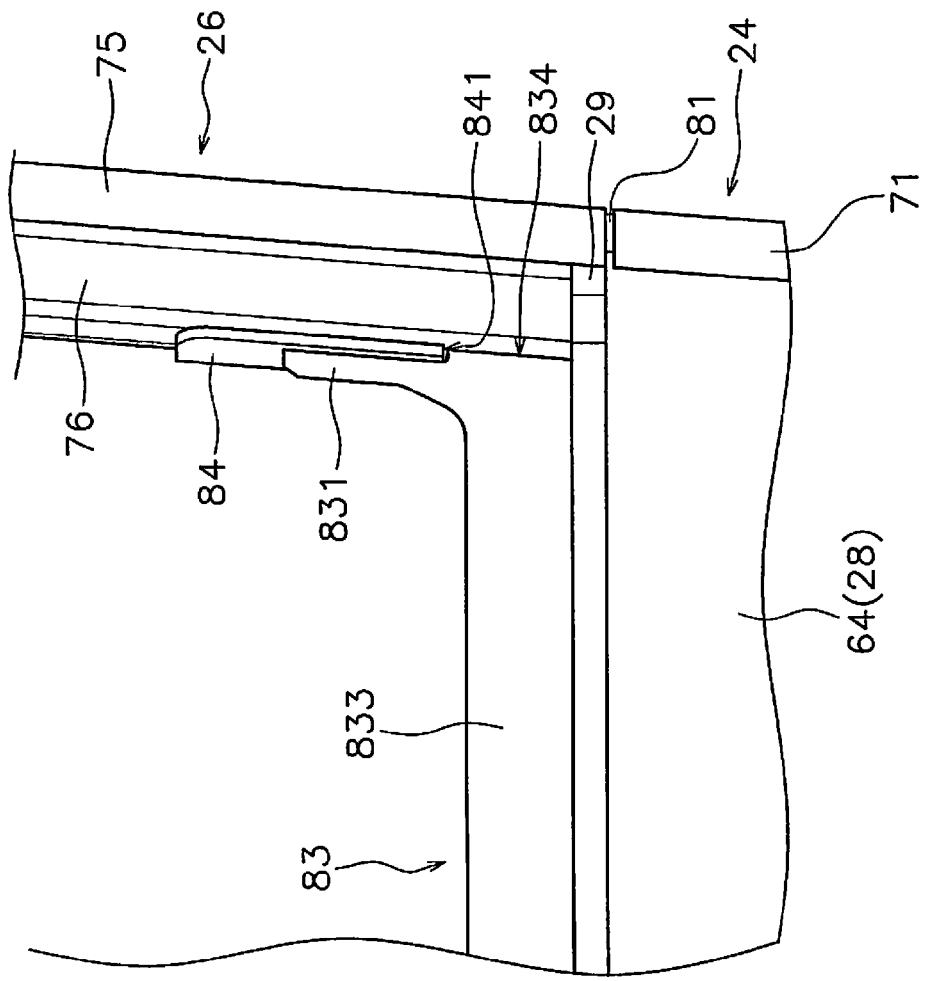
FIG. 11 is a front view illustrating a connection structure for the front-left pillar and the left supporting member.
Figure 12:
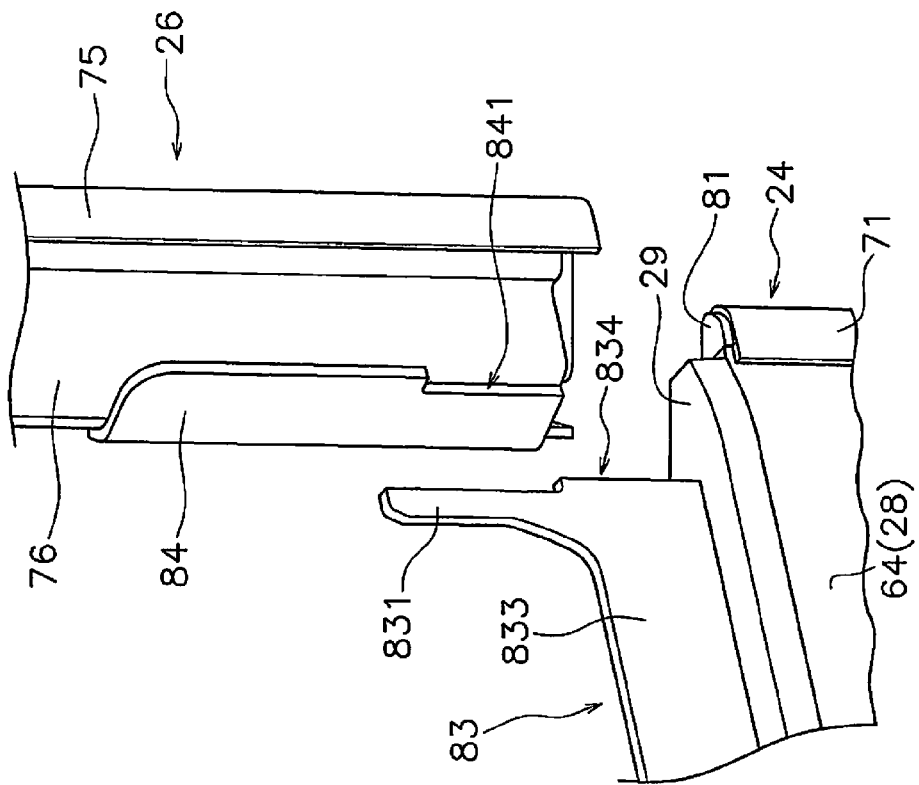
FIG. 12 is an exploded perspective view illustrating the connection structure for the front-left pillar and the left supporting member.

FIG. 11 is a front view illustrating a connection structure for the front-left pillar 26 and the left supporting member 24. FIG. 12 is an exploded perspective view illustrating the connection structure for the front-left pillar 26 and the left supporting member 24. As illustrated in FIG. 11 and FIG. 12, the first left-pillar part 75 extends to below the upper surface of the front panel reinforcement member 29. A left connection-reinforcement member 81 is arranged between the lower end of the first left-pillar part 75 and the upper end of the first left supporting member 24.

The left connection-reinforcement member 81 is thinner than the front panel reinforcement member 29 in the vertical direction. The left connection-reinforcement member 81 is mounted on the upper end of the left supporting member 24. The left connection-reinforcement member 81 is welded to the upper end of the left supporting member 24. The lower end of the first left-pillar part 75 is mounted on the left connection-reinforcement member 81. The lower end of the first left-pillar part 75 is welded to the left connection-reinforcement member 81. That is, the first left-pillar part 75 is connected to the first left supporting member 24 through the left connection-reinforcement member 81. More specifically, the first left-pillar part 75 is connected to the first left supporting part 71 through the left connection-reinforcement member 81.

The lower end of the second left-pillar part 76 is located above the lower end of the first left-pillar part 75. The lower end of the second left-pillar part 76 is directly connected to the upper surface of the front panel reinforcement member 29. The lower end of the second left-pillar part 76 is welded to the upper surface of the front panel reinforcement member 29. Moreover, the upper end of the second left supporting member 24 is connected to the lower surface of the left connection-reinforcement member 81. Moreover, the upper end of the second left supporting member 24 is welded to the lower surface of the left connection-reinforcement member 81.

Figure 13:
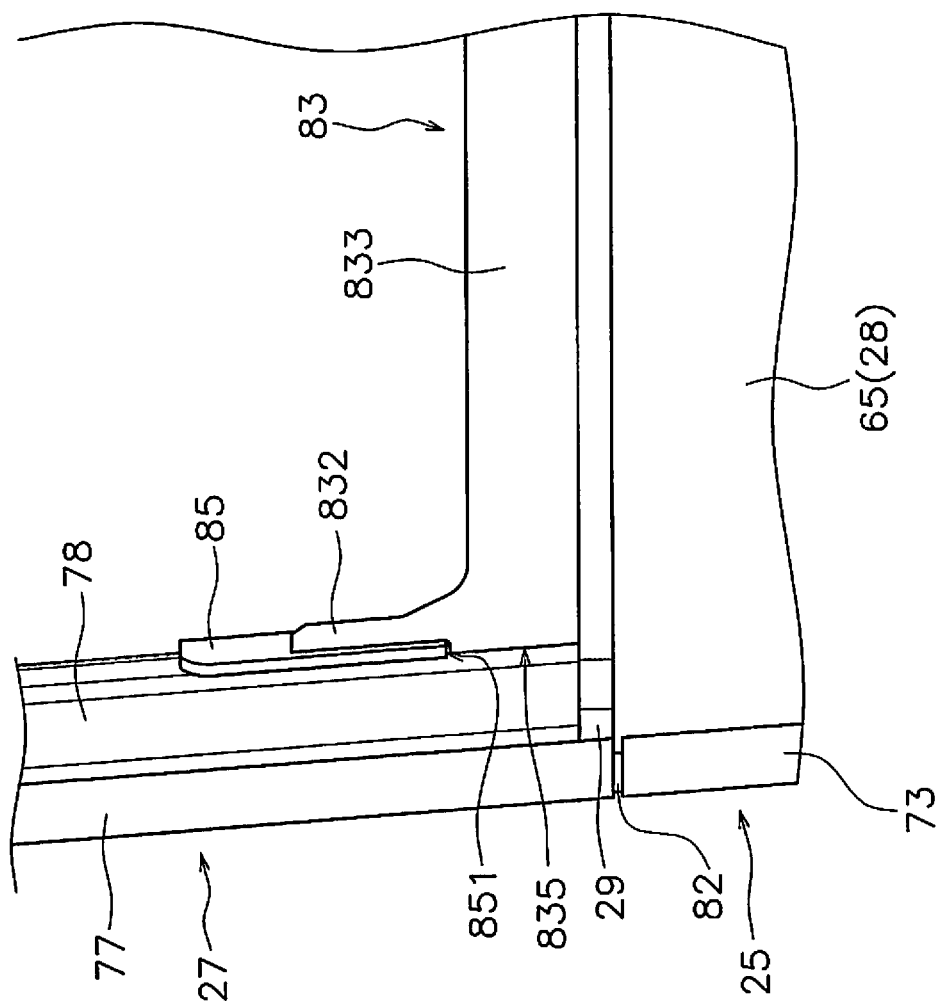
FIG. 13 is a front view illustrating a connection structure for the front-right pillar and the right supporting member.
Figure 14:
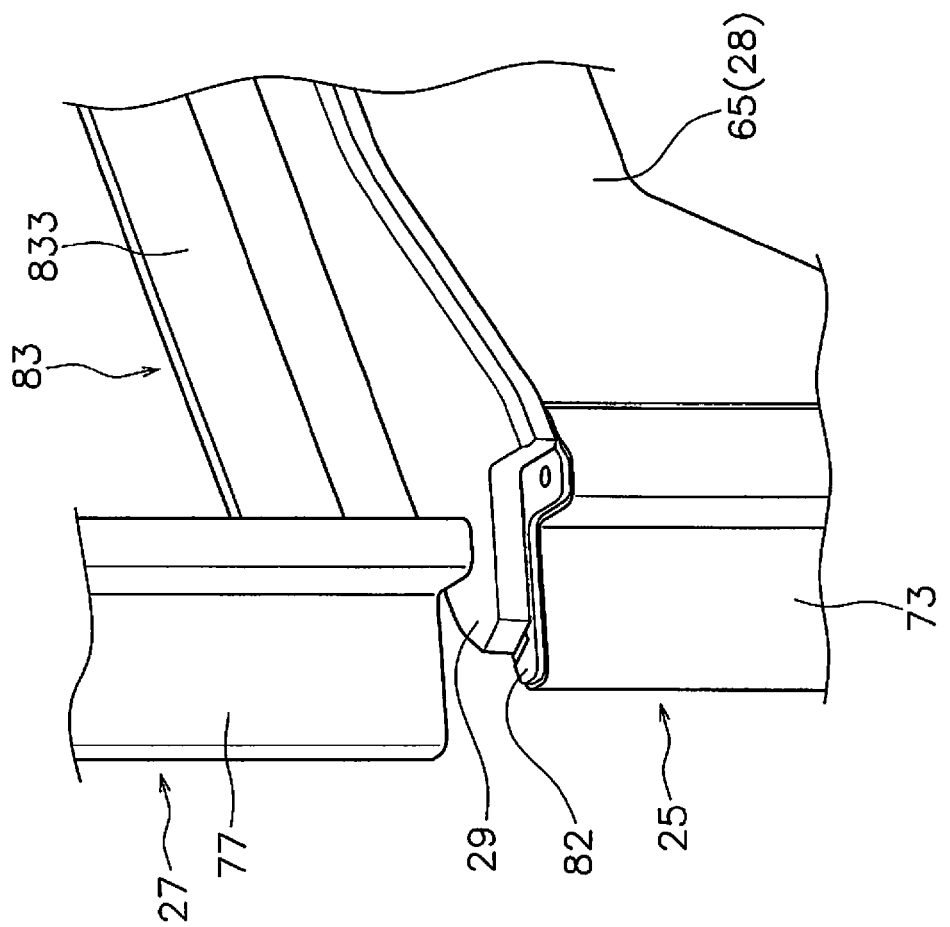
FIG. 14 is an exploded perspective view illustrating the connection structure for the front-right pillar and the right supporting member.

FIG. 13 is a front view illustrating a connection structure for the front-right pillar 27 and the right supporting member 25. FIG. 14 is an exploded perspective view illustrating the connection structure for the front-right pillar 27 and the right supporting member 25. As illustrated in FIG. 13 and FIG. 14, the first right-pillar part 77 extends to below the upper surface of the front panel reinforcement member 29. A right connection-reinforcement member 82 is arranged between the lower end of the first right-pillar part 77 and the upper end of the first left supporting member 25. The right connection-reinforcement member 82 is thinner than the front panel reinforcement member 29 in the vertical direction. The right connection-reinforcement member 82 is mounted on the upper end of the right supporting member 25. The right connection-reinforcement member 82 is welded to the upper end of the right supporting member 25. The lower end of the first right-pillar part 77 is mounted on the right connection-reinforcement member 82. The lower end of the first right-pillar part 77 is welded to the right connection-reinforcement member 82. That is, the first right-pillar part 77 is connected to the first right supporting member 25 through the right connection-reinforcement member 82. More specifically, the first right-pillar part 77 is connected to the first right supporting part 73 through the right connection-reinforcement member 82.

The lower end of the second right-pillar part 78 is located above the lower end of the first right-pillar part 77. The lower end of the second right-pillar part 78 is directly connected to the upper surface of the front panel reinforcement member 29. The lower end of the second right-pillar part 78 is welded to the upper surface of the front panel reinforcement member 29. Moreover, the upper end of the second right supporting member 25 is connected to the lower surface of the right connection-reinforcement member 82. Moreover, the upper end of the second right supporting member 25 is connected to the lower surface of the right connection-reinforcement member 82.

As illustrated in FIG. 5 and FIG. 6, a pillar supporting member 83 is arranged above the front panel reinforcement member 29. The pillar supporting member 83 is a plate-like member extending in a left-right direction. The pillar supporting member 83 connects the front-left pillar 26 and the front-right pillar 27. The pillar supporting member 83 is welded to the upper surface of the front panel reinforcement member 29.

The pillar supporting member 83 includes a left section 831, a right section 832, and a center section 833. The center section 833 is located between the left section 831 and the right section 832, connecting the left section 831 and the right section 832. The left section 831, and the right section 832 each project upward from the center section 833.

As illustrated in FIG. 11 and FIG. 12, a left pillar-reinforcement member 84 is mounted to the inner lateral section of the front-left pillar 26. The left pillar-reinforcement member 84 is welded to the inner lateral section of the front-left pillar 26. More specifically, as illustrated in FIG. 9, the left pillar-reinforcement member 84 is mounted to span the first left-pillar part 75 and the second left-pillar part 76. The left pillar-reinforcement member 84 is arranged between the left section 831 of the pillar supporting member 83, and the inner lateral section of the front-left pillar 26. That is, the left section 831 of the pillar supporting member 83 is connected to the front-left pillar 26 through the left pillar-reinforcement member 84. More specifically, as illustrated in FIG. 11 and FIG. 12, the lower portion of the left section 831 includes a left convex portion 834. The lower portion of the left pillar-reinforcement member 84 includes a left concave portion 841. The left convex portion 834 joins with the left concave portion 841.

As illustrated in FIG. 13 and FIG. 14, a right pillar-reinforcement member 85 is mounted to the inner lateral section of the front-right pillar 27. The right pillar-reinforcement member 85 is welded to the inner lateral section of the front-right pillar 27. More specifically, as illustrated in FIG. 10, the right pillar-reinforcement member 85 is mounted to span the first right-pillar part 77 and the second right-pillar part 78. The right pillar-reinforcement member 85 is arranged between the right section 832 of the pillar supporting member 83, and the inner lateral section of the front-right pillar 27. That is, the right section 832 of the pillar supporting member 83 is connected to the front-right pillar 27 through the right pillar-reinforcement member 85. More specifically, as illustrated in FIG. 13, the lower portion of the right section 832 includes a right convex portion 835. The lower portion of the right pillar-reinforcement member 85 includes a right concave portion 851. The right convex portion 835 joins with the right concave portion 851.

The front-left and front-right pillars 26 and 27 in the cab 5 of the work vehicle 1 according to the described exemplary embodiment are shorter compared to front-left and front-right pillars that are arranged extending from the floor 22 to the ceiling 23. Therefore, the flexural strength of the front-left and front-right pillars 26 and 27 may be improved. Additionally, reduced front visibility may be prevented because the front-left and front-right pillars 26 and 27 are thinner than the left and right supporting members 24 and 25. That is, the left and right supporting members 24 and 25 are thicker than the front-left and front-right pillars 26 and 27. Accordingly, the flexural strength of the left and right supporting members 24 and 25 may be improved. Additionally, the left and right supporting members 24 and 25 are located below the front-left and front-right pillars 26 and 27, thus preventing reduced front visibility even when the left and right supporting members are given a greater thickness.

Particularly, the work vehicle 1 of the exemplary embodiment is a motor grader. An operator in the cab 5 of the motor grader operates the blade 14 in front while watching the blade 14. Accordingly, the exemplary embodiment is even more effective for preventing reduced front visibility.

The front-left pillar 26 is longer than the left supporting member 24 in the vertical direction. The front-right pillar 27 is longer than the right supporting member 25 in the vertical direction. Therefore, it is possible to further improve front visibility.

The front surface of the left supporting member 24 is open, and the front surface of the right supporting member 25 is open. The front panel 28 is mounted to the left supporting member 24 to close off the opening in the left supporting member 24. The front panel 28 is mounted to the right supporting member 25 to close off the opening in the right supporting member 25. Therefore, the left and right supporting members 24 and 25 may be reduced in size compared to left and right supporting members which have no opening and to which the front panel 28 is mounted. Additionally, the front panel 28 closes off the openings in the left and right supporting members 24 and 25, preventing a reduction in the strength of the left and right supporting members 24 and 25.

The left supporting member 24 may be divided into the first left supporting part 71 and the second left supporting part 72. Therefore, the left supporting member 24 and front panel 28 may be easily assembled even if the left supporting member 24 has a complex shape. Providing first and second left supporting member assemblies also facilitates manufacturing of the left supporting member 24 even when the left supporting member 24 has a complicated shape. The right supporting member 25 is configured in the same manner.

The second left supporting part 72 is a thicker sheet-thickness than the first left supporting part 71. Accordingly, the flexural rigidity of the left supporting member 24 may be further improved. The first left supporting part 71 is a thinner sheet-thickness than the second left supporting part 72. Therefore, the first left supporting part 71 may be easily formed in a complex shape. The first right supporting part 73 is configured in the same manner.

The front-left pillar 26 may be divided into the first left-pillar part 75 and the second left-pillar part 76. Providing first and second left-pillar parts thus facilitates manufacturing of the front-left pillar 26 even when the front-left pillar 26 has a complex shape. Herewith, the freedom in designing the cross sectional shape of the front-left pillar 26 improves. The front-right pillar 27 is configured in the same manner.

The second left-pillar part 76 is a thinner sheet-thickness than the second left supporting part 72. Therefore, the workability of the second left-pillar part 76 improves. Accordingly, the second left-pillar part 76 may be easily formed in a complex shape. The second right-pillar part 78 is configured in the same manner.

The first left-pillar part 75 is a thinner sheet-thickness than the second left supporting part 72. Therefore, the workability of the first left-pillar part 75 improves. Accordingly, the first left-pillar part 75 may be easily formed in a complex shape. The first right-pillar part 77 is configured in the same manner.

The first left-pillar part 75 extends to below the upper surface of the front panel reinforcement member 29 and connects to the left supporting member 24. The left connection-reinforcement member 81 is thinner than the front panel reinforcement member 29 in the vertical direction. Thus the seam between the first left-pillar part 75 and the first left supporting part 71 may be reduced. The first left-pillar part 75 is connected to the left supporting member 24 through the left connection-reinforcement member 81 and thus creates a solid connection between the first left-pillar part 75 of the front-left pillar 26 and the first left supporting part 71. The front-right pillar 27 is configured in the same manner.

The front-left pillar 26 and the front-right pillar 27 are connected by the pillar supporting member 83. Therefore, the flexural strength of the front-left pillar 26 and the front-right pillar 27 may be further improved.

The left section 831 of the pillar supporting member 83 is connected to the front-left pillar 26 through the left pillar-reinforcement member 84. Therefore, the strength of the connecting section between the left section 831 of the pillar supporting member 83 and the front-left pillar 26 may be further improved. The strength of the connecting section between the right section 832 of the pillar supporting member 83 and the front-right pillar 27 may be similarly improved.

The left convex portion 834 on the left section 831 of the pillar supporting member 83 joins with the left concave portion 841 in the left pillar-reinforcement member 84. This creates a solid connection between the left section 831 of the pillar supporting member 83 and the left pillar-reinforcement member 84. This also creates a solid connection between the right section 832 of the pillar supporting member 83 and the right pillar-reinforcement member 85.

Here ends the description of one exemplary embodiment of the present invention. The present invention is not limited to these descriptions but may be modified in various ways and so far as the modifications do not deviate from the spirit of the present invention.

The work vehicle need not be limited to a motor grader, and may be another type, such as a bulldozer or a wheel loader.

The cab is not limited to the shape described in the above exemplary embodiment and is variable. For example, the cab is not limited to a hexagonal prism and may be a rectangular solid or cuboid. Alternatively, the cab may be configured with curved contours.

The shape of the front-left pillar and the front-right pillar is not limited to the shape described in the above exemplary embodiment and is variable. The shape of the left supporting member and the right supporting member is not limited to the shape described in the above exemplary embodiment and is variable. The front-left pillar and the front-right pillar may respectively be formed as an integral unit. The left supporting member and the right supporting member may respectively be formed as an integral unit.

The left and right connection-reinforcement members may be omitted. The pillar supporting member may be omitted. The left and right pillar-reinforcement members may be omitted.

A left concave portion may be provided in the left section of the pillar supporting member, and a left convex portion may be provided on the left pillar-reinforcement member. Similarly, a right concave portion may be provided in the right section of the pillar supporting member, and a right convex portion provided on the right pillar-reinforcement member. Alternatively, the left convex portion and the left concave portion may be omitted. Alternatively, the right convex portion and the right concave portion may be omitted.

The operating member 47 are not limited to being hydraulic, and may be motor operated. The operating member 47 are not limited to mounting on the steering post 27, and may be mounted to another component. For example, the operating member 47 may be arranged next to the driver seat 44.

The present invention provides a cab and work vehicle wherein the flexural strength of the front pillars may be improved while preventing reduced front visibility.

The invention claimed is:

1. A work vehicle cab comprising:
a floor;
a ceiling arranged above the floor;
a left supporting member extending upward from a front section of the floor;
a right supporting member extending upward from the front section of the floor;
a front panel arranged between the left supporting member and the right supporting member;
a front panel reinforcement member arranged above the front panel, the front panel reinforcement member extending in a left-right direction, the front panel reinforcement member connecting the left supporting member and the right supporting member;
a front-left pillar extending from a front section of the ceiling to the front panel reinforcement member; and
a front-right pillar extending from the front section of the ceiling to the front panel reinforcement member,
the front surface of the left supporting member being open,
the front surface of the right supporting member being open,
the front panel being mounted to the left supporting member to close off an opening in the left supporting member, and
the front panel being mounted to the right supporting member to close off an opening in the right supporting member.

2. The work vehicle cab according to claim 1, wherein
the front-left pillar is longer than the left supporting member in the vertical direction; and
the front-right pillar is longer than the right supporting member in the vertical direction.

3. The work vehicle cab according to claim 1, wherein
the front-left pillar is thinner than the left supporting member; and the front-right pillar is thinner than the right supporting member.

4. The work vehicle cab according to claim 1, wherein the left supporting member includes
   a first left supporting part secured to a left section of the front panel; and
   a second left supporting part separate from the first left supporting part, the second left supporting part being arranged in an inner lateral side of the first left supporting part and behind the front panel, the second left supporting part being secured to the first left supporting part; and
the right supporting member includes
   a first right supporting part secured to a right section of the front panel; and
   a second right supporting part separate from the first right supporting part, the second right supporting part being arranged in the inner lateral side of the first right supporting part and behind the front panel, the second right supporting part being secured to the first right supporting part.

5. The work vehicle cab according to claim 4, wherein the second left supporting part is a thicker sheet-thickness than the first left supporting part; and
the second right supporting part is a thicker sheet-thickness than the first right supporting part.

6. The work vehicle cab according to claim 4, wherein the front-left pillar includes
   a first left-pillar part configuring an outer lateral section of the front-left pillar; and
   a second left-pillar part separate from the first left-pillar part, the second left-pillar part configuring an inner lateral section of the front-left pillar, the second left pillar part being secured to the first left-pillar part; and
the front-right pillar includes
   a first right-pillar part configuring an outer lateral section of the front-right pillar; and
   a second right-pillar part separate from the first right-pillar part, the second right-pillar part configuring an inner lateral section of the front-right pillar, the second right-pillar part being secured to the first right-pillar part.

7. The cab of a work vehicle according to claim 6, wherein the second left-pillar part is a thinner sheet-thickness than the second left supporting part; and
the second right-pillar part is a thinner sheet-thickness than the second right supporting part.

8. The work vehicle cab according to claim 6, wherein the first left-pillar part is a thinner sheet-thickness than the second left supporting part; and
the first right-pillar part is a thinner sheet-thickness than the second right supporting part.

9. A work vehicle comprising
a cab according to claim 1;
a front frame arranged in front of the cab, the front frame extending longitudinally;
a front wheel supported at a front section of the front frame;
a drawbar arranged below the front frame, the drawbar being pivotally mounted on the front section of the front frame to move vertically; and
a blade supported at a rear section of the drawbar.

10. A work vehicle cab comprising:
a floor;
a ceiling arranged above the floor;
a left supporting member extending upward from a front section of the floor;
a right supporting member extending upward from the front section of the floor;
a front panel arranged between the left supporting member and the right supporting member;
a front panel reinforcement member arranged above the front panel, the front panel reinforcement member extending in a left-right direction, the front panel reinforcement member connecting the left supporting member and the right supporting member;
a front-left pillar extending from a front section of the ceiling to the front panel reinforcement member, the front-left pillar including
   an inner-left section connected to an upper surface of the front panel reinforcement member, and
   an outer-left section extending to below the upper surface of the front panel reinforcement member, the outer-left section being connected to the left supporting member; and
a front-right pillar extending from the front section of the ceiling to the front panel reinforcement member, the front-right pillar including
   an inner-right section connected to the upper surface of the front panel reinforcement member, and
   an outer-right section extending to below the upper surface of the front panel reinforcement member, the outer-right section being connected to the right supporting member.

11. A work vehicle cab comprising:
a floor;
a ceiling arranged above the floor;
a left supporting member extending upward from a front section of the floor;
a right supporting member extending upward from the front section of the floor;
a front panel arranged between the left supporting member and the right supporting member;
a front panel reinforcement member arranged above the front panel, the front panel reinforcement member extending in a left-right direction, the front panel reinforcement member connecting the left supporting member and the right supporting member;
a front-left pillar extending from a front section of the ceiling to the front panel reinforcement member, the left supporting member including
   a first left supporting part configuring an outer lateral section of the front panel, and
   a second left supporting part separate from the first left supporting part, the second left supporting part configuring an inner lateral section of the first left supporting part, the second left supporting part being secured to the first left supporting part; and
a front-right pillar extending from the front section of the ceiling to the front panel reinforcement member, the right supporting member including
   a first right supporting part configuring an outer lateral section of the front panel, and
   a second right supporting part separate from the first right supporting part, the second right supporting part configuring an inner lateral section of the first right supporting part, the second right supporting part being secured to the first right supporting part.

12. A work vehicle comprising
a cab according to claim 11;
a front frame arranged in front of the cab, the front frame extending longitudinally;
a front wheel supported at a front section of the front frame;

a drawbar arranged below the front frame, the drawbar being pivotally mounted on the front section of the front frame to move vertically; and a blade supported at a rear section of the drawbar.

13. A work vehicle comprising a cab according to claim 10;

a front frame arranged in front of the cab, the front frame extending longitudinally;

a front wheel supported at a front section of the front frame;

a drawbar arranged below the front frame, the drawbar being pivotally mounted on the front section of the front frame to move vertically; and a blade supported at a rear section of the drawbar.

14. The work vehicle cab according to claim 10, further comprising a left connection-reinforcement member thinner than the front panel reinforcement member in the vertical direction, the left connection-reinforcement member being mounted on an upper end of the left supporting member; and a right connection-reinforcement member thinner than the front panel reinforcement member in the vertical direction, the right connection-reinforcement member being mounted on an upper end of the right supporting member; wherein the outer-left section is connected to the left supporting member through the left connection-reinforcement member; and the outer-right section is connected to the right supporting member through the right connection-reinforcement member.

15. A work vehicle cab comprising:

a floor;

a ceiling arranged above the floor;

a left supporting member extending upward from a front section of the floor;

a right supporting member extending upward from the front section of the floor;

a front panel arranged between the left supporting member and the right supporting member;

a front panel reinforcement member arranged above the front panel, the front panel reinforcement member extending in a left-right direction, the front panel reinforcement member connecting the left supporting member and the right supporting member;

a front-left pillar extending from a front section of the ceiling to the front panel reinforcement member;

a front-right pillar extending from the front section of the ceiling to the front panel reinforcement member, a pillar supporting member arranged above the front panel reinforcement member, the pillar supporting member extending in a left-right direction, the pillar supporting member connecting the front-left pillar and the front-right pillar;

a left pillar-reinforcement member mounted to an inner lateral section of the front-left pillar; and a right pillar-reinforcement member mounted to an inner lateral section of the front-right pillar; wherein a left section of the pillar supporting member is connected to the front-left pillar through the left pillar-reinforcement member; and a right section of the pillar supporting member is connected to the front-right pillar through the right pillar-reinforcement member.

16. The work vehicle cab according to claim 15, wherein one of the left section of the pillar supporting member and the left pillar-reinforcement member includes a left convex portion;

the other of the left section of the pillar supporting member and the left pillar-reinforcement member includes a left concave portion joining with the left convex portion;

one of the right section of the pillar supporting member and the left pillar-reinforcement member includes a right convex portion; and the other of the right section of the pillar supporting member and the right pillar-reinforcement member includes a right concave portion joining with the right convex portion.

17. A work vehicle comprising a cab according to claim 15;

a front frame arranged in front of the cab, the front frame extending longitudinally;

a front wheel supported at a front section of the front frame;

a drawbar arranged below the front frame, the drawbar being pivotally mounted on the front section of the front frame to move vertically; and a blade supported at a rear section of the drawbar.

* * * * *